(12) United States Patent
Kitago

(10) Patent No.: US 10,400,917 B2
(45) Date of Patent: *Sep. 3, 2019

(54) CABLE TIE LOCKING STRUCTURE AND CABLE TIE TOOL

(71) Applicant: HellermannTyton CO., LTD., Tokyo (JP)

(72) Inventor: Toru Kitago, Himeji (JP)

(73) Assignee: HELLERMANNTYTON CO., LTD. (JP)

(*) Notice: Subject to any disclaimer, the term of this patent is extended or adjusted under 35 U.S.C. 154(b) by 0 days.

This patent is subject to a terminal disclaimer.

(21) Appl. No.: 15/024,106

(22) PCT Filed: Sep. 25, 2013

(86) PCT No.: PCT/JP2013/075934
§ 371 (c)(1),
(2) Date: Mar. 23, 2016

(87) PCT Pub. No.: WO2015/045040
PCT Pub. Date: Apr. 2, 2015

(65) Prior Publication Data
US 2016/0230907 A1 Aug. 11, 2016

(51) Int. Cl.
*B65B 13/02* (2006.01)
*B65D 63/08* (2006.01)
(Continued)

(52) U.S. Cl.
CPC .......... *F16L 3/233* (2013.01); *B65B 13/027* (2013.01); *B65B 27/06* (2013.01); *B65D 63/00* (2013.01);
(Continued)

(58) Field of Classification Search
CPC ........ B65D 63/04; B65D 63/08; B65D 63/00; B65B 27/06; B65B 13/027; F16L 3/233; F16B 2/08; F16B 17/008
See application file for complete search history.

(56) References Cited

U.S. PATENT DOCUMENTS 2,059,906 A * 11/1936 Prestwich ............. B65D 63/04
24/20 EE
3,748,697 A * 7/1973 Marchese ............. F16L 33/035
24/19
(Continued)

FOREIGN PATENT DOCUMENTS

EP 1 775 220 A2 4/2007
EP 1 899 240 B1 10/2008
(Continued)

OTHER PUBLICATIONS

International Search Report, dated Nov. 12, 2013 (dated Nov. 12, 2013).

*Primary Examiner* — Jimmy T Nguyen
(74) *Attorney, Agent, or Firm* — Robert J. Myers

(57) ABSTRACT

In a locking structure of a cable tie, the cable tie includes a strap portion and a head portion. A first locking hole at a proximal end of the strap portion, and a second locking hole of the head portion, are formed in a shape wherein their widths in a short-side direction of the strap portion are longer than those in a longitudinal direction of the strap portion, and include a first inner wall surface and a second inner wall surface, respectively, that extend in a direction substantially orthogonal to the longitudinal direction of the strap portion, on the side nearer to the proximal end of the cable tie. The distal end of the strap portion has a protruded portion that protrudes through the first locking hole and into the second locking hole.

5 Claims, 14 Drawing Sheets

(51) Int. Cl.
*B65D 63/00* (2006.01)
*F16L 3/233* (2006.01)
*B65D 63/04* (2006.01)
*B65B 27/06* (2006.01)
*F16B 2/08* (2006.01)
*F16B 17/00* (2006.01)

(52) U.S. Cl.
CPC ............. *B65D 63/04* (2013.01); *B65D 63/08* (2013.01); *F16B 2/08* (2013.01); *F16B 17/008* (2013.01)

(56) References Cited

U.S. PATENT DOCUMENTS

| | | | | |
|---|---|---|---|---|
| 4,333,210 | A | * | 6/1982 | Burnett .................. B65D 33/34 24/16 PB |
| 4,765,032 | A | * | 8/1988 | Fortsch .................. B65D 63/06 24/23 R |
| 4,868,953 | A | * | 9/1989 | Fortsch .................. B65D 63/06 24/23 R |
| 5,123,456 | A | * | 6/1992 | Jansen .................. B25B 25/005 140/123.6 |
| 5,644,819 | A | * | 7/1997 | Lyons .................... B65D 63/08 24/16 PB |
| 6,014,792 | A | * | 1/2000 | Marelin .................. F16L 33/02 24/20 R |
| 6,122,804 | A | * | 9/2000 | Gamaggio-Schafer ...................... B65D 63/06 24/20 R |
| 7,650,680 | B2 | | 1/2010 | Stillings et al. |
| 8,424,166 | B2 | * | 4/2013 | Dorneman ............. B21D 22/04 24/20 R |
| 2006/0288539 | A1 | * | 12/2006 | Caveney ............... B65B 13/027 24/20 R |
| 2007/0084022 | A1 | | 4/2007 | Stillings et al. |
| 2008/0209692 | A1 | | 9/2008 | Caveney et al. |

FOREIGN PATENT DOCUMENTS

| | | |
|---|---|---|
| EP | 2 219 802 B1 | 5/2013 |
| JP | 2011-502638 | 1/2011 |

* cited by examiner

Fig.2
(a) 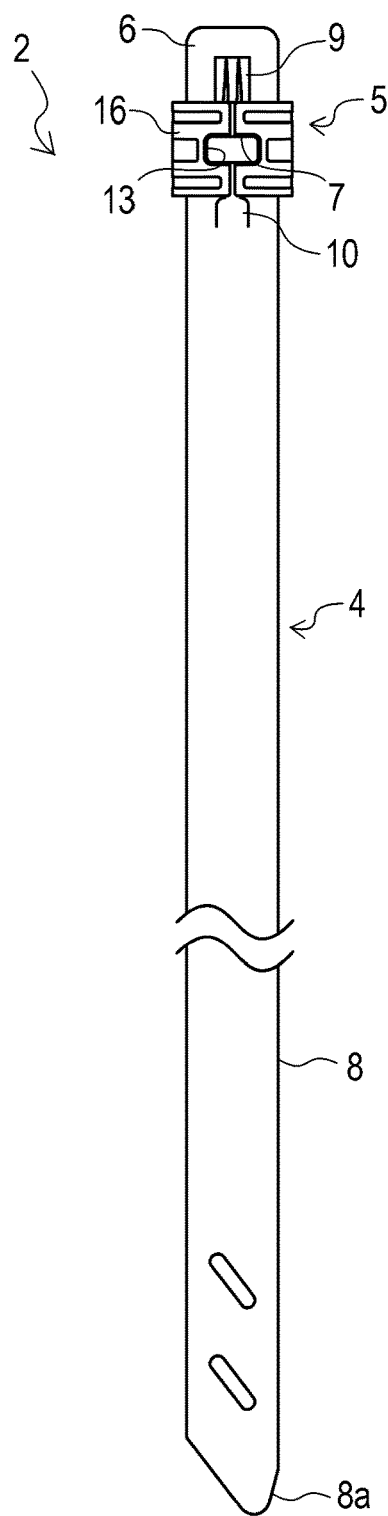
(b) 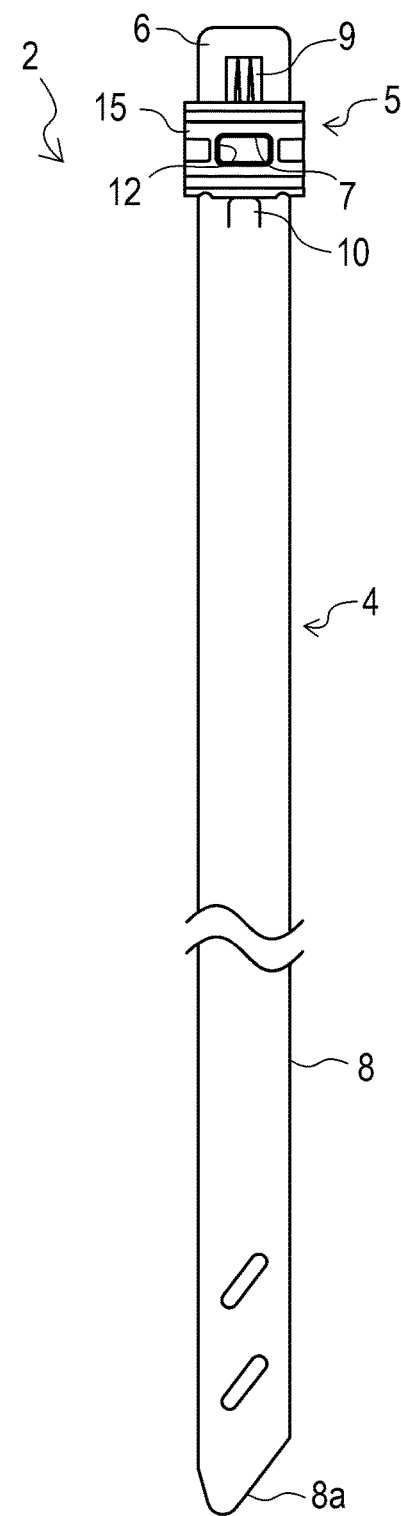

Fig.4
(a)
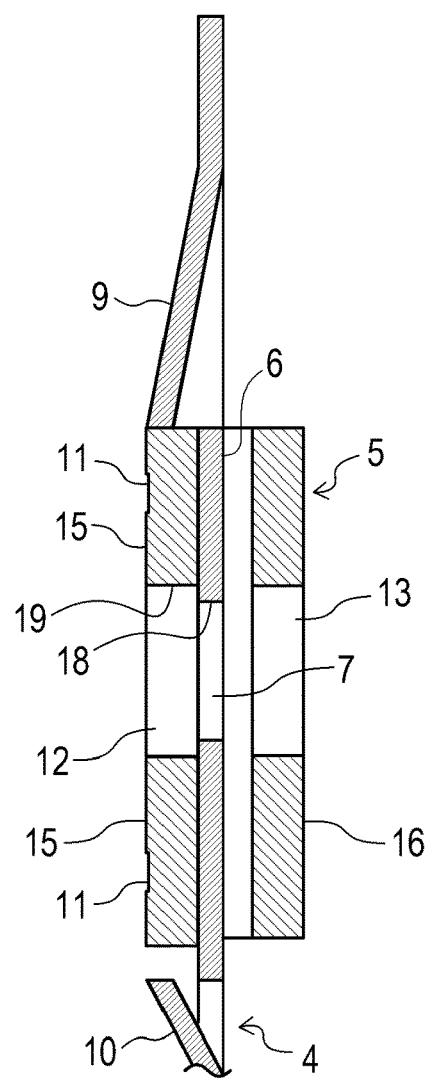
(b)
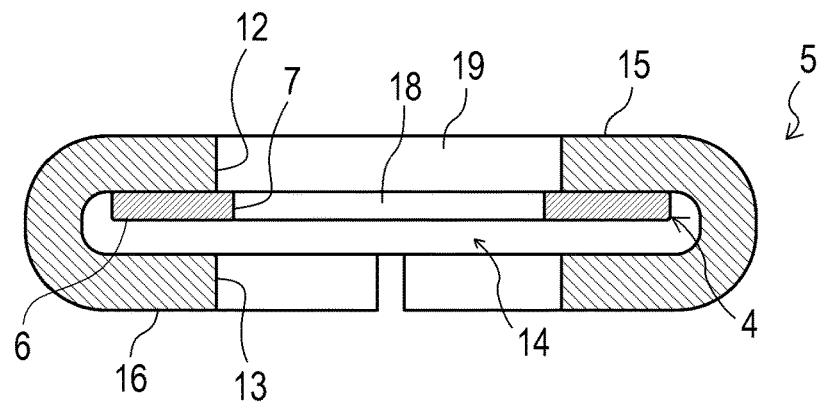

Fig.7
(a)
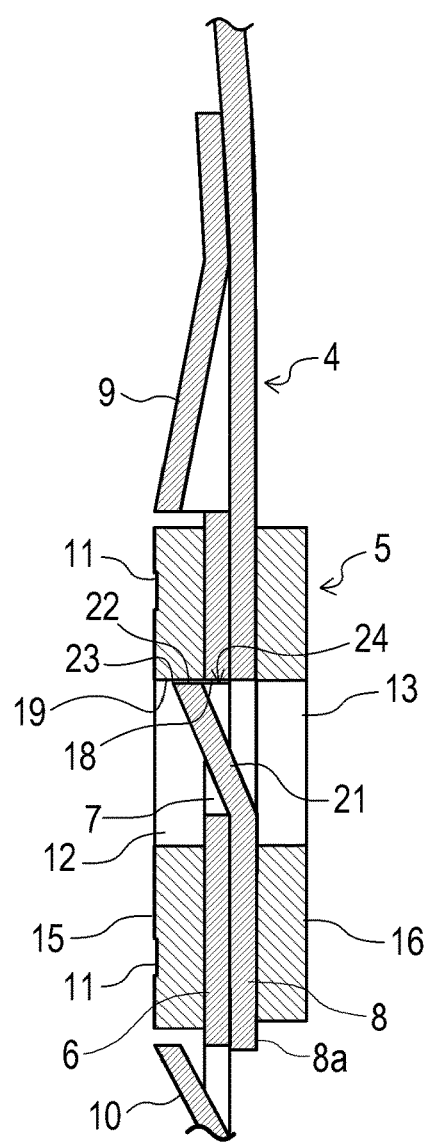
(b)
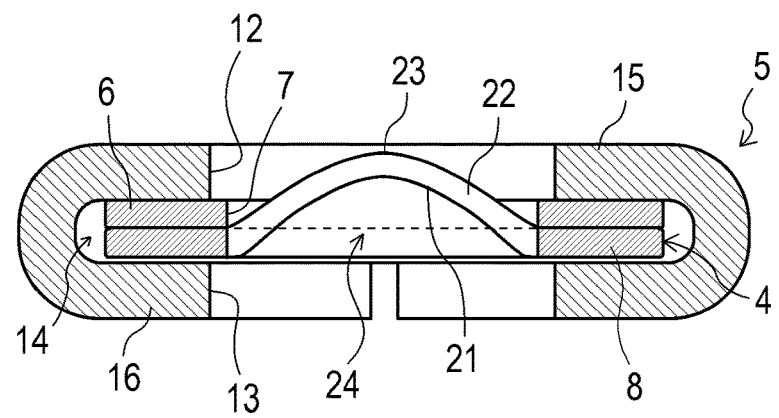

Fig.8
(a)
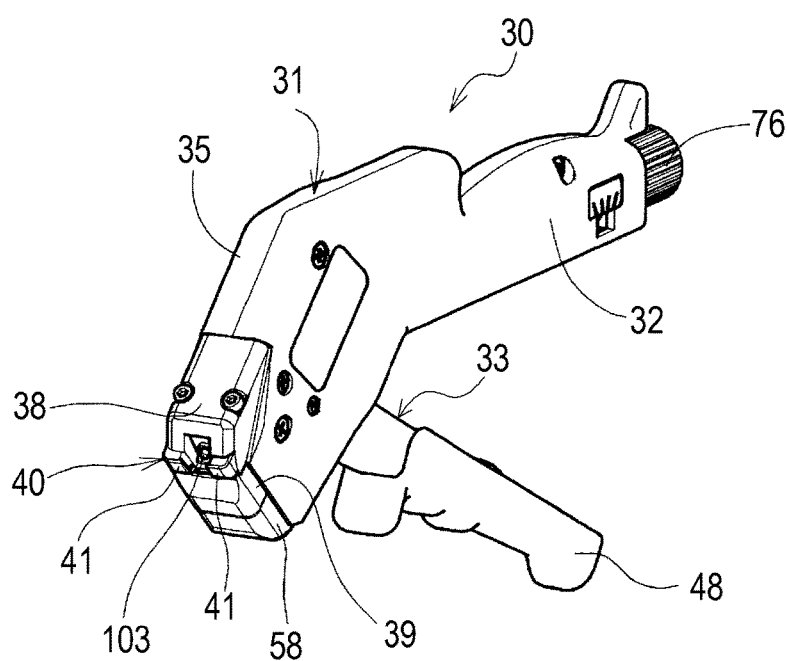
(b)
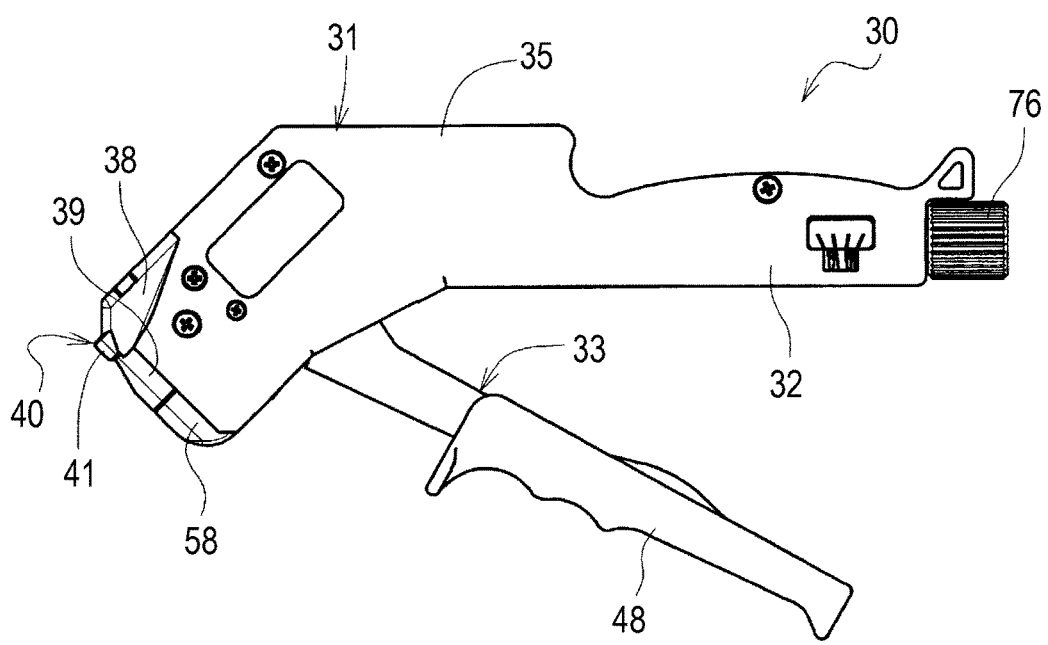

Fig.11
(a)
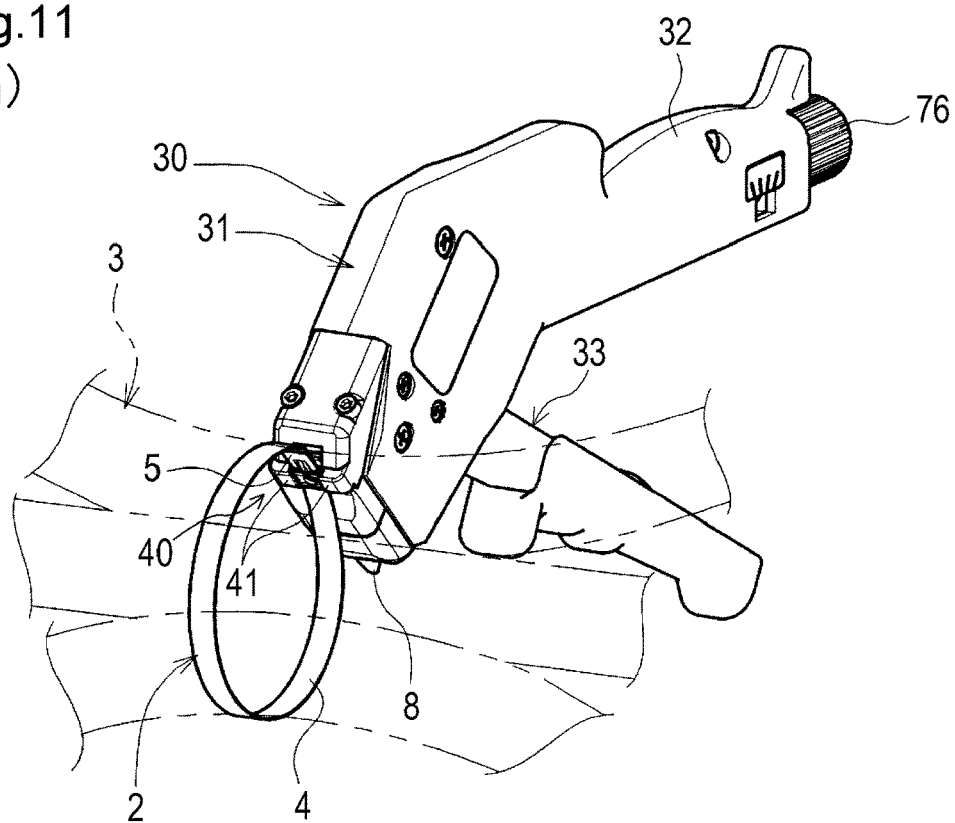
(b)
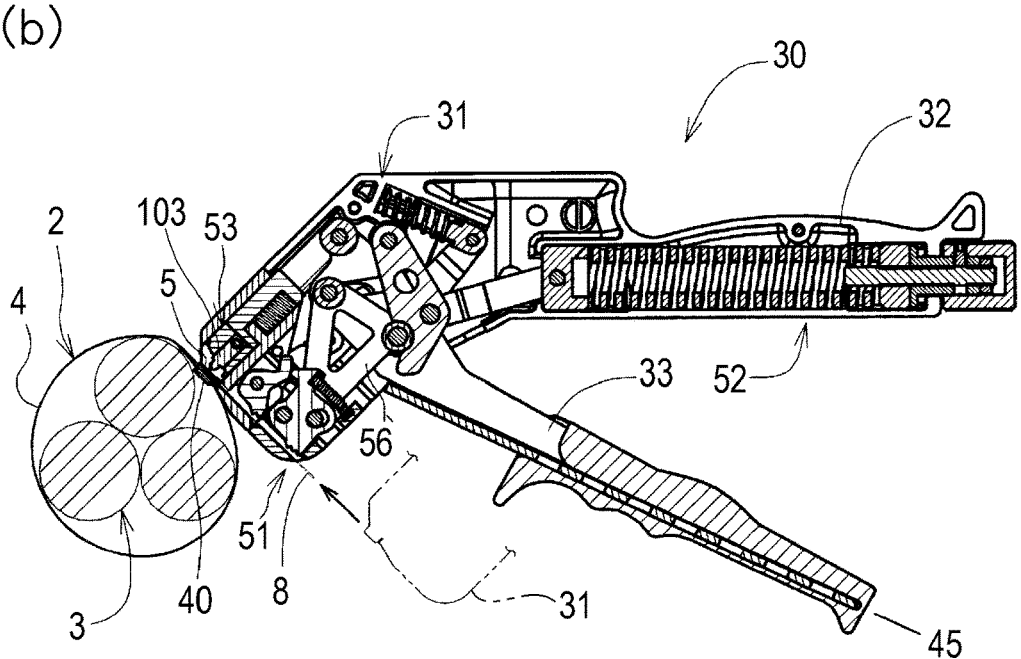

Fig.14
(a)
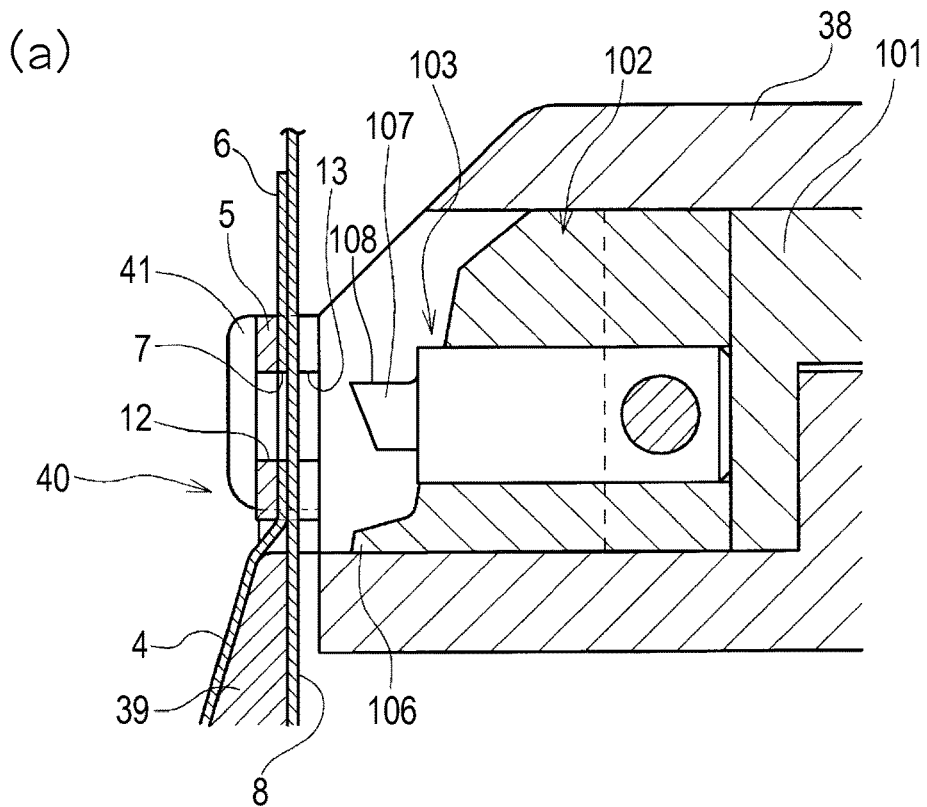
(b)
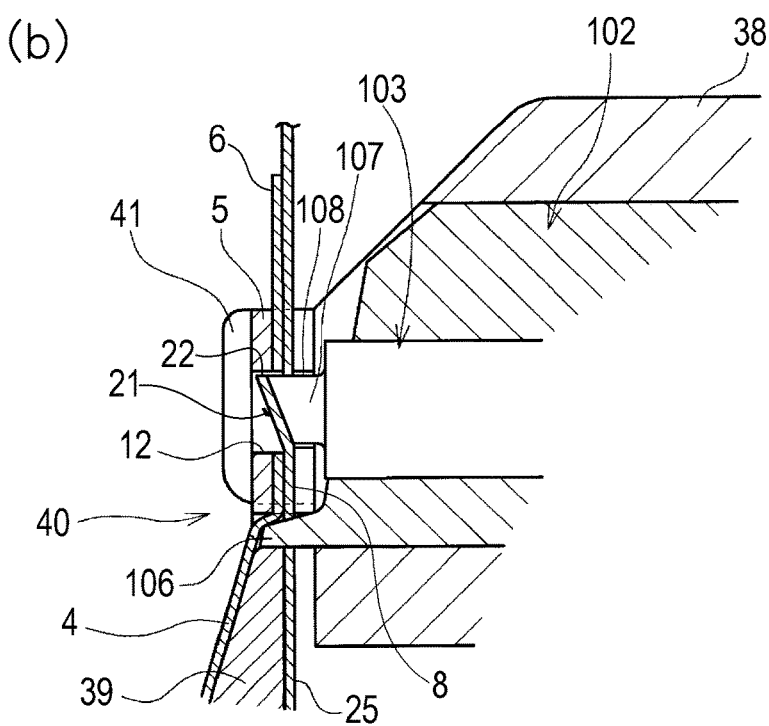

CABLE TIE LOCKING STRUCTURE AND CABLE TIE TOOL

TECHNICAL FIELD

The present invention relates to a cable tie locking structure and a cable tie tool.

BACKGROUND ART

A cable tie locking structure for locking a distal end of the cable tie to a proximal end so as to keep the tie wrapped around and holding together material to be bundled, such as the one described in Patent Document 1, for example, is known. In the cable tie locking structure of this type, the cable tie includes a strap portion and a head portion. The strap portion is formed as a strap and includes a first locking hole that extends through in a thickness direction at the proximal end.

The head portion can let the strap portion pass therethrough, and is provided so as to surround the proximal end and the distal end of the strap portion that are overlapped upon one another, and is secured to the proximal end. The head portion includes a second locking hole and a through hole at positions respectively facing the proximal end and the distal end of the strap portion to coincide with the first locking hole of the strap portion.

At the distal end of the strap portion, at a point where the first locking hole and the second locking hole coincide with each other, there is provided, with the use of a punch member of a cable tie tool, a protruded portion that protrudes through the first locking hole and into the second locking hole. The protruded portion makes engagement with a first inner wall surface of the first locking hole and a second inner wall surface of the second locking hole so that the distal end of the strap portion is secured to the head portion and to the proximal end of the strap portion.

However, in this cable tie locking structure, the protruded portion is formed by means of the punch member in a hollow conical or columnar shape. The protruded portion thus engages with the first inner wall surface of the first locking hole and the second inner wall surface of the second locking hole in a relatively small area. Therefore, when the cable tie being used has a relatively large width in the short-side direction of the strap portion in comparison to this area, there is a possibility that the protruded portion goes out of engagement and the distal end of the strap portion is released from the head portion, if the distal end of the strap portion is pulled by the material to be bundled which is wrapped and held together by the tie, in a direction in which it is pulled out of the head portion. Namely, in some cases the distal end of the cable tie may not be secured to the proximal end firmly enough.

PRIOR ART DOCUMENTS

Patent Documents

Patent Document 1: U.S. Pat. No. 7,650,680

SUMMARY OF THE INVENTION

Problems to be Solved by the Invention

The present invention was made in consideration of such circumstances, and it is an object of the invention to provide a cable tie locking structure that allows a distal end of a cable tie to be firmly secured to a proximal end, and a cable tie tool for realizing this cable tie locking structure.

Solutions to the Problems

According to an embodiment of the invention, a cable tie locking structure is presented. The cable tie locking structure includes a cable tie having a strip of plastically deformable strap portion with a first locking hole that extends through in a thickness direction at a proximal end thereof, and a head portion provided so as to surround the proximal end and a distal end of the strap portion that are overlapped upon one another, and secured to the proximal end, the head portion including a second locking hole and a through hole at positions respectively facing the proximal end and the distal end of the strap portion to coincide with the first locking hole of the strap portion, the locking structure securing the distal end of the strap portion to the proximal end thereof and to the head portion so as to keep the cable tie wrapped around and holding together material to be bundled. The first locking hole is formed in a shape with a first portion located nearer to the proximal end of the strap portion having a larger width in a short-side direction of the strap portion than that of a second portion extending along a longitudinal direction of the strap portion, and has a first inner wall surface extending in a direction substantially orthogonal to the longitudinal direction of the strap portion at the first portion located nearer to the proximal end of the strap portion. The second locking hole is formed in a shape with a third portion located nearer to the proximal end of the strap portion having a larger width in the short-side direction of the strap portion than that of a fourth portion extending along the longitudinal direction of the strap portion, and has a second inner wall surface extending in a direction substantially orthogonal to the longitudinal direction of the strap portion at the third portion located nearer to the proximal end of the strap portion. The distal end of the strap portion has a protruded portion at a point where the first locking hole, the second locking hole, and the through hole coincide with each other, the protruding portion being protruded through the first locking hole and into the second locking hole by being subjected to pressure from the through hole side. The protruded portion has an engagement surface that faces the first inner wall surface and the second inner wall surface and that extends along these inner wall surfaces, so that the protruded portion can engage with the first inner wall surface and the second inner wall surface at this engagement surface.

With this configuration, when the cable tie is wrapped around and holds together the material to be bundled, the engagement surface of the protruded portion at the distal end of the strap portion makes contact and engages with the first inner wall surface at the proximal end of the strap portion and with the second inner wall surface in the head portion in a relatively wide area, so that, even if the cable tie being used has a relatively large width in the short-side direction of the strap portion, it can exhibit improved performance of securing the distal end of the strap portion to the proximal end of the strap portion and to the head portion. Therefore, the distal end of the strap portion can be firmly secured to the proximal end thereof and to the head portion, i.e., the distal end of the cable tie can be firmly secured to the proximal end thereof. As a result, the material to be bundled can be maintained tied up favorably by the cable tie.

The protruded portion may have a peak positioned substantially coplanar with the engagement surface.

With this configuration, the engagement surface can be made larger without causing a decrease in the strength of the protruded portion, so that the engagement surface can engage with the first inner wall surface and the second inner wall surface in a wider area. Therefore, the distal end of the strap portion can be secured to the proximal end of the strap portion and to the head portion with a higher strength.

The cable tie locking structure may include a punch member capable of forming the protruded portion as set forth in claim 1 or 2 in the distal end of the strap portion.

Effects of the Invention

The present invention can provide a cable tie locking structure that allows a distal end of a cable tie to be firmly secured to a proximal end, and a cable tie tool for realizing this cable tie locking structure.

BRIEF DESCRIPTION OF THE DRAWINGS

FIG. 2(a) is a front view of the cable tie according to one embodiment of the present invention, and FIG. 2(b) is a back view of the cable tie according to one embodiment of the present invention.

FIG. 4(a) is a cross section viewed in the direction of arrows I-I in FIG. 3, and FIG. 4(b) is a cross section viewed in the direction of arrows II-II in FIG. 3.

FIG. 7(a) is a cross section viewed in the direction of arrows III-III in FIG. 6, and FIG. 7(b) is a cross section viewed in the direction of arrows IV-IV in FIG. 6.

FIG. 8(a) is a perspective view of a cable tie tool according to one embodiment of the present invention, and FIG. 8(b) is a side view of the cable tie tool according to one embodiment of the present invention.

FIG. 11(a) is a perspective view showing an example of a state of use of the cable tie tool according to one embodiment of the present invention, and FIG. 11(b) is a cross-sectional view showing an example of a state of use of the cable tie tool according to one embodiment of the present invention.

FIG. 14(a) is a cross-sectional view showing a punch member in a retracted position in the cable tie tool according to one embodiment of the present invention, and FIG. 14(b) is a cross-sectional view showing the punch member in a protruding position in the cable tie tool according to one embodiment of the present invention.

EMBODIMENTS OF THE INVENTION

Preferred embodiments of the present invention will be described with reference to the drawings.

Figure 1:
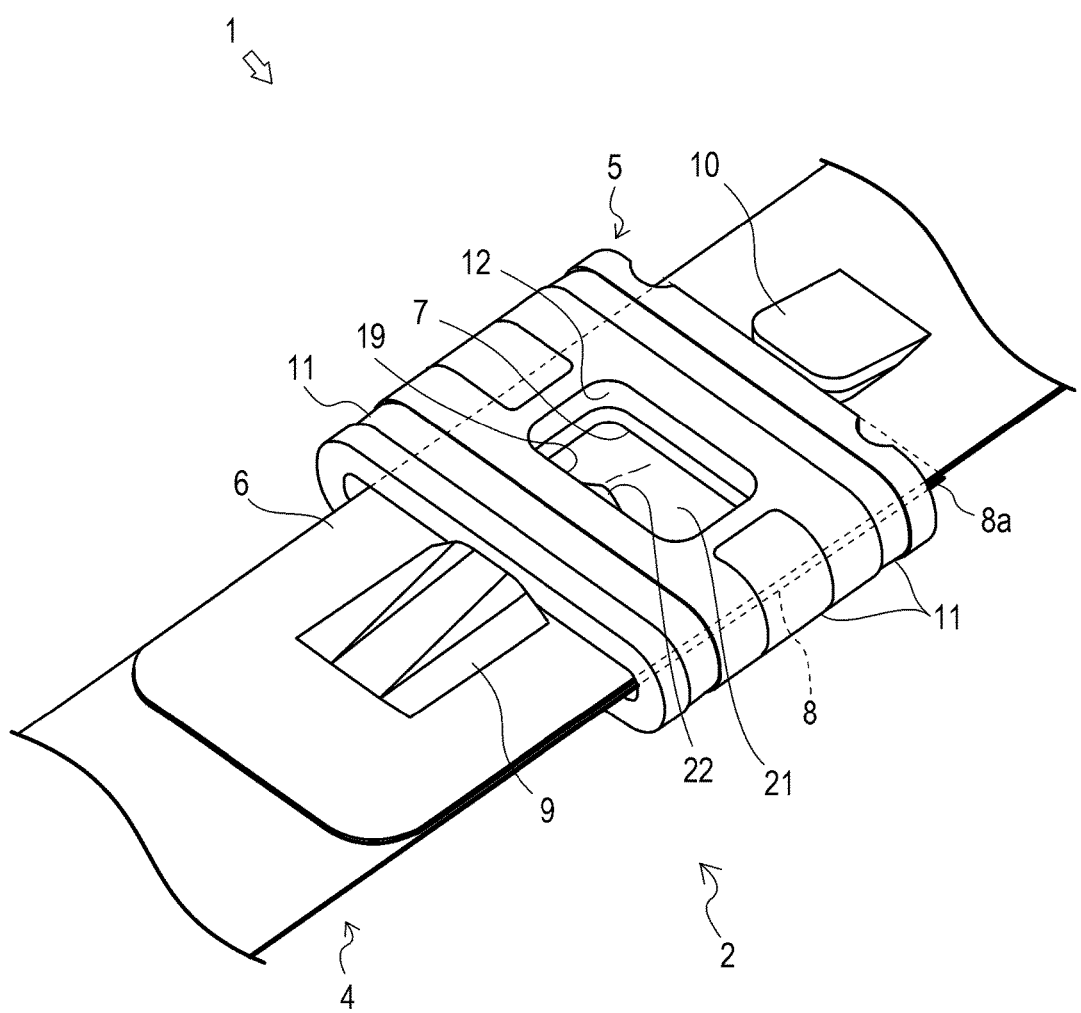
FIG. 1 is a perspective view of a cable tie locking structure according to one embodiment of the present invention.
Figure 3:
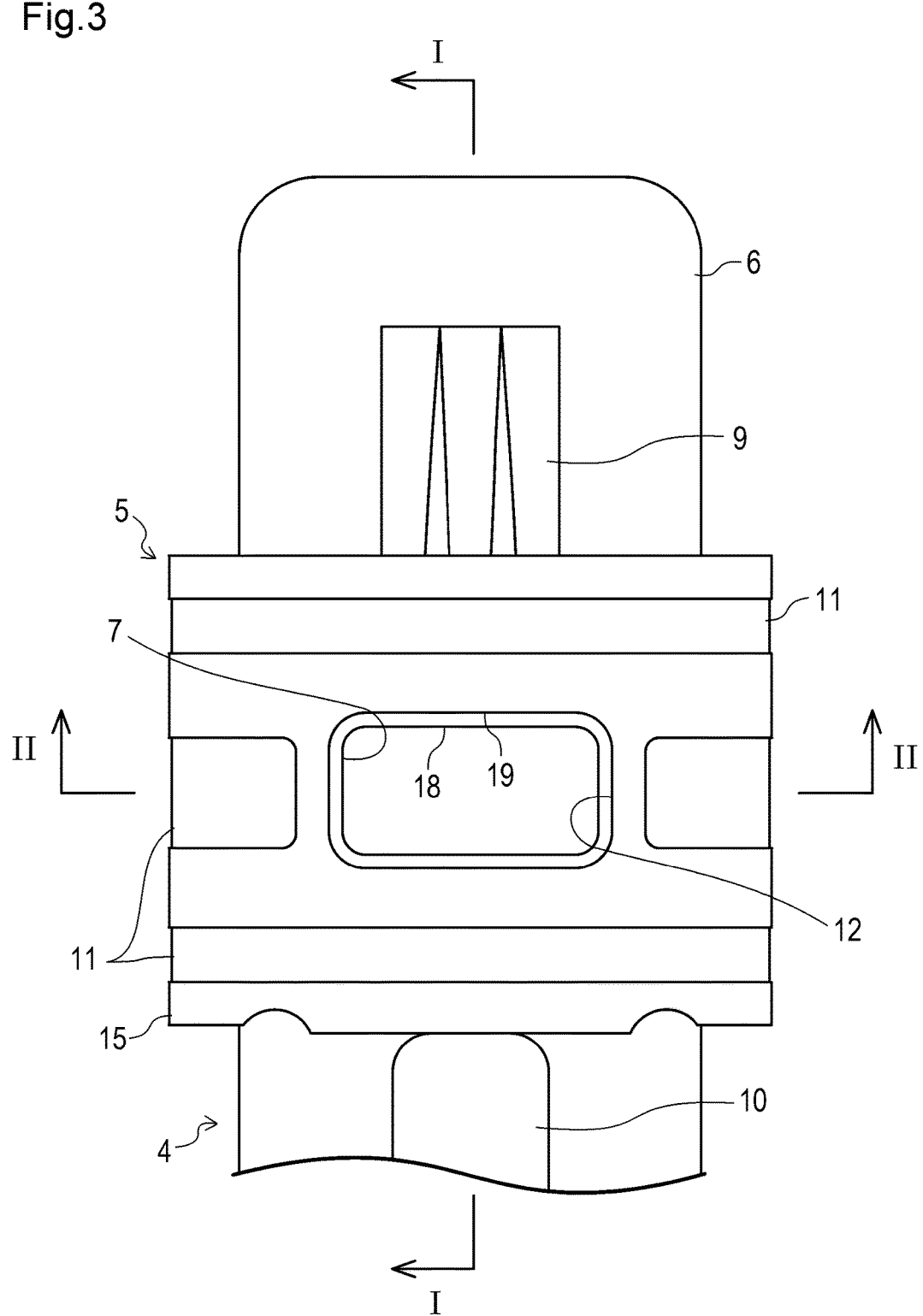
FIG. 3 is an enlarged back view of part of the cable tie according to one embodiment of the present invention.
Figure 5:
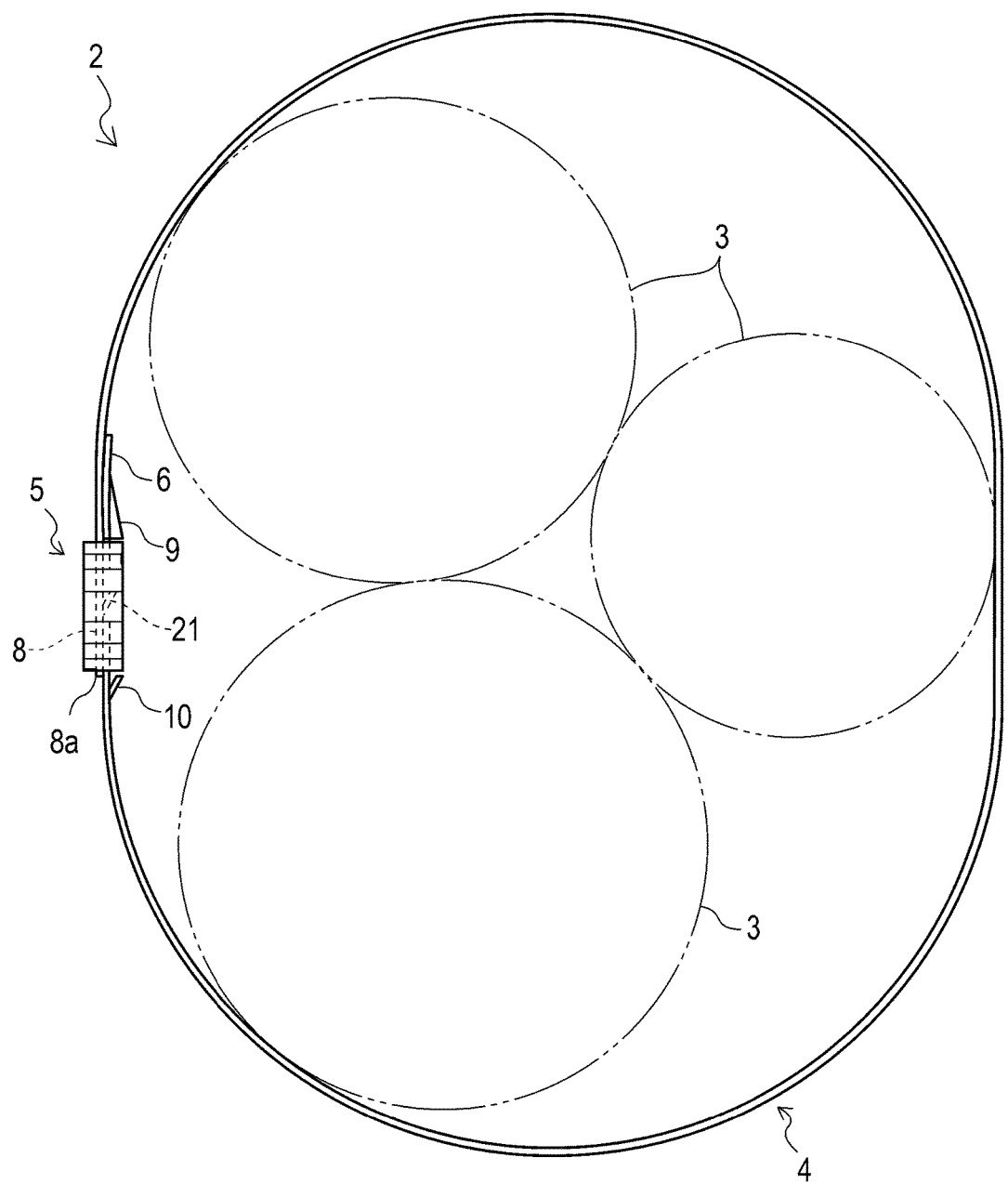
FIG. 5 is a view showing an example of a state of use of the cable tie according to one embodiment of the present invention.
Figure 6:
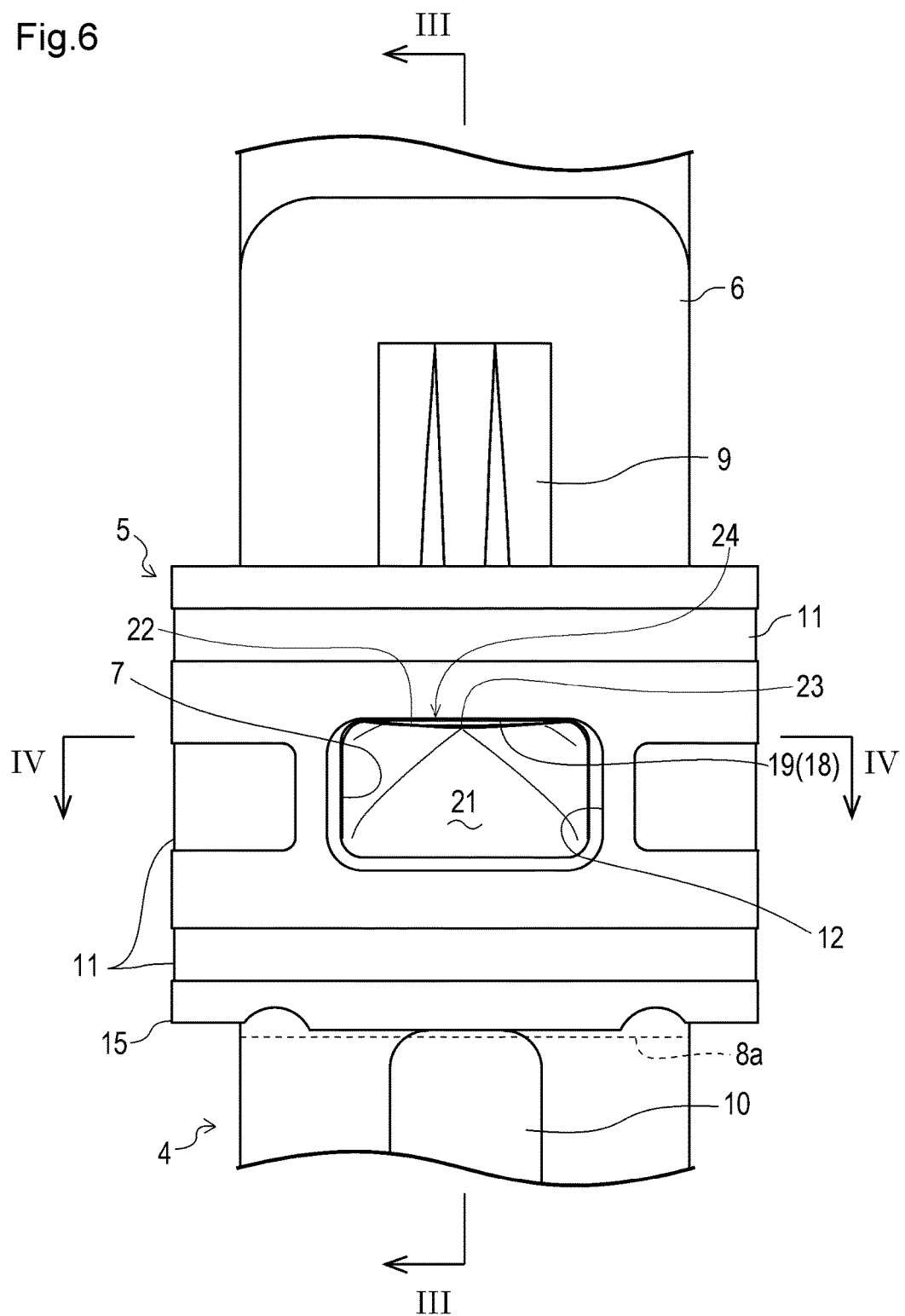
FIG. 6 is an enlarged back view of part of the cable tie in use according to one embodiment of the present invention.

FIG. 1 shows a locking structure 1 of a cable tie 2 according to one embodiment. FIG. 2(a) shows a front view of the cable tie 2. FIG. 2(b) shows a back view of the cable tie 2. FIG. 3 shows an enlarged back view of part of the cable tie 2. FIG. 4(a) shows a cross section viewed in the direction of arrows I-I in FIG. 3. FIG. 4(b) shows a cross section viewed in the direction of arrows II-II in FIG. 3. FIG. 5 shows an example of a state of use of the cable tie 2. FIG. 6 shows an enlarged back view of part of the cable tie 2 in use. FIG. 7(a) shows a cross section viewed in the direction of arrows III-III in FIG. 6. FIG. 7(b) shows a cross section viewed in the direction of arrows IV-IV in FIG. 6.

The locking structure 1 of the cable tie 2 is designed to lock a distal end of the cable tie 2 to a proximal end so as to keep the cable tie 2 in a state in which it wraps and holds together material to be bundled 3 such as wires, pipes, and tubes (see FIG. 5). As shown in FIG. 1, FIG. 2, FIG. 3, and FIG. 4, the cable tie 2 includes a strap portion 4 and a head portion 5. Hereinafter, one end in a longitudinal direction of the cable tie 2 (strap portion 4) will be referred to as the proximal end, while the other end in the longitudinal direction will be referred to as the distal end.

The strap portion 4 is a strip of plastically deformable member and includes a first locking hole 7 that extends through in a thickness direction at the proximal end 6. In this embodiment, the strap portion 4 is a component made of metal such as stainless steel and formed to have a substantially uniform thickness. At the proximal end 6 of the strap portion 4, a stopper 9 and a cut-and-lifted pawl 10 are provided on both sides of the first locking hole 7 in the longitudinal direction of this strap portion 4.

As shown in FIG. 6 and FIG. 7, the head portion 5 is provided so as to surround the proximal end 6 and the distal end 8 of the strap portion 4 that are overlapped upon one another, and is secured to the proximal end 6 of this strap portion 4. The head portion 5 includes a second locking hole 12 and a through hole 13 at positions respectively facing the proximal end 6 and the distal end 8 of the strap portion 4 to coincide with the first locking hole 7 of the strap portion 4.

In this embodiment, the head portion 5 is a strip of metal material such as stainless steel plate and formed to have a flattened C-shape with an opening on the surface (i.e., the front side) (see FIG. 4(b)) of the cable tie 2. A plurality of beads 11 are formed around the outer periphery of the head portion 5 along a direction orthogonal to the longitudinal direction of the strap portion 4. Inside the head portion 5 is provided a passage 14 that allows the proximal end 6 and the distal end 8 of the strap portion 4 that are overlapped upon one another in the thickness direction to pass through.

In the passage 14, the proximal end 6 of the strap portion 4 is disposed on the rear surface (i.e., the backside) of the cable tie 2, while the distal end 8 of the strap portion 4 is disposed on the front side of the cable tie 2. The dimension in the thickness direction of the passage 14 is set the same or slightly smaller than the dimension in the thickness direction of the proximal end 6 and the distal end 8 of the strap portion 4 that are overlapped upon one another in two layers.

The head portion 5, when the proximal end 6 of the strap portion 4 is passed through the passage 14 in the up and down direction, is positioned between the stopper 9 and the cut-and-lifted pawl 10 provided to this proximal end 6 to engage with them, whereby the head portion is fixed in this position. Namely, the head portion 5 is secured to the proximal end 6 of the strap portion 4 with the use of the stopper 9 and the cut-and-lifted pawl 10.

The head portion 5 includes a backside wall 15 and a front side wall 16 that sandwich the passage 14 in the direction orthogonal to the longitudinal direction of the strap portion 4 (front to back direction). The second locking hole 12 and the through hole 13 are provided in the backside wall 15 and the front side wall 16, respectively, such that they are located coaxial with the first locking hole 7, with the proximal end 6 of the strap portion 4 being fixed to the head portion 5.

At the proximal end 6 of the strap portion 4, the first locking hole 7 is formed in a shape with a portion located nearer to the proximal end of the strap portion 4 having a larger width in a short-side direction (width direction, or left to right direction) of the strap portion 4 than that of the portion extending along the longitudinal direction of the strap portion 4. The first locking hole 7 includes a first inner wall surface 18 in the portion located nearer to the proximal end of the strap portion 4. The first inner wall surface 18 is formed to extend in a direction substantially orthogonal to the longitudinal direction of the strap portion.

In this embodiment, the first locking hole 7 is formed to be rectangular, having the long sides extending along the short-side direction of the strap portion 4 when viewed from the backside of the cable tie 2, and includes the first inner wall surface 18 that is planar in the portion corresponding to one linear side (upper side) of the rectangle located nearer to the proximal end of the cable tie 2. The first locking hole 7 is formed to have an opening area that is the same or slightly smaller than that of the second locking hole 12 when viewed from the backside of the cable tie 2.

In the head portion 5, the second locking hole 12 is formed in a shape with a portion located nearer to the proximal end of the strap portion 4 having a larger width in the short-side direction of the strap portion 4 than that of the portion extending along the longitudinal direction of the strap portion 4. The second locking hole 12 includes a second inner wall surface 19 in the portion located nearer to the proximal end of the strap portion 4. The second inner wall surface 19 is formed to extend in a direction substantially orthogonal to the longitudinal direction of the strap portion 4.

In this embodiment, the second locking hole 12 is formed rectangular, having the long sides extending along the short-side direction of the strap portion 4 when viewed from the backside of the cable tie 2, and includes the second inner wall surface 19 that is planar in the portion corresponding to one linear side (upper side) of the rectangle located nearer to the proximal end of the cable tie 2. The dimension in the thickness direction of the second inner wall surface 19 (dimension in the thickness direction of the backside wall 15 of the head portion 5) is set larger than the dimension in the thickness direction of the first inner wall surface 18 (dimension in the thickness direction of the proximal end 6 of the strap portion 4).

As shown in FIG. 6 and FIG. 7, the distal end 8 of the strap portion 4 has a protruded portion 21. This protruded portion 21 is provided, at the point where the first locking hole 7 of the strap portion 4 and the second locking hole 12 and through hole 13 of the head portion 5 coincide with each other, so as to pass through the first locking hole 7 and protrude into the second locking hole 12, by pressure being applied to the distal end 8 of the strap portion 4 from the through hole 13 side.

The protruded portion 21 has an engagement surface 22 that faces the first inner wall surface 18 and the second inner wall surface 19 and that extends along these inner wall surfaces 18 and 19, so that the protruded portion can engage with the first inner wall surface 18 and the second inner wall surface 19 at this engagement surface 22. The engagement surface 22, first inner wall surface 18, and second inner wall surface 19 are formed to have a width along the short-side direction of the strap portion 4 that is about half of the width of the strap portion 4 in this embodiment.

In this embodiment, the protruded portion 21 is formed rectangular when viewed from the backside of the cable tie 2, and includes the engagement surface 22 in the portion corresponding to one linear side (upper side) of the rectangle located nearer to the proximal end of the strap portion 4. The protruded portion 21 includes, in addition to the engagement surface 22, an opening 24 that opens to the first inner wall surface 18 in the portion located nearer to the proximal end of the strap portion 4.

The engagement surface 22 is formed to have an arch-like shape when viewed from the proximal end of the cable tie 2 along the opening 24 as shown in FIG. 7(b). The engagement surface 22 is substantially planar along a direction substantially orthogonal to the longitudinal direction of the strap portion 4 similarly to the first inner wall surface 18 and the second inner wall surface 19, and disposed in close proximity to both of the first inner wall surface 18 and the second inner wall surface 19 that may be positioned substantially coplanar so as to be able to make contact with these inner wall surfaces.

With this configuration, when the cable tie 2 is wrapped around and holds together the material to be bundled 3 as shown in FIG. 5, the engagement surface 22 of the protruded portion 21 at the distal end 8 of the strap portion makes contact and engages with the first inner wall surface 18 at the proximal end 6 of the strap portion 4 and with the second inner wall surface 19 in the head portion 5 in a relatively wide area, so that, even if the cable tie being used has a relatively large width in the short-side direction of the strap portion 4, it can exhibit improved performance of securing the distal end 8 of the strap portion 4 to the proximal end 6 of the strap portion 4 and to the head portion 5. Therefore, the distal end 8 of the strap portion 4 can be firmly secured to the proximal end 6 thereof and to the head portion 5, i.e., the distal end of the cable tie 2 can be firmly secured to the proximal end thereof. As a result, the material to be bundled 3 can be maintained tied up favorably by the cable tie 2.

In the locking structure 1 of the cable tie 2, the protruded portion 21 is formed in a pointed shape to have a peak 23 positioned substantially coplanar with the engagement surface 22. In this embodiment, the protruded portion 21 is formed to incline relative to the backside of the distal end 8 of the strap portion 4, with the end on the proximal side of the strap portion 4 being high and the end on the distal side of the strap portion 4 being low when viewed in a cross section as shown in FIG. 7(a). This way, the peak (pointed end) 23 of the protruded portion 21 is positioned closest to the proximal end of the strap portion 4, preferably substantially in the center in the short-side direction of the strap portion 4.

With this configuration, the engagement surface 22 can be made larger without causing a decrease in the strength of the protruded portion 21, so that the engagement surface 22 can engage with the first inner wall surface 18 and the second inner wall surface 19 in a wider area. Therefore, the distal end 8 of the strap portion 4 can be secured to the proximal end 6 of the strap portion 4 and to the head portion 5 with a higher strength.

Next, one embodiment of a cable tie tool used to realize the locking structure of the cable tie according to the present invention will be described.

Figure 9:
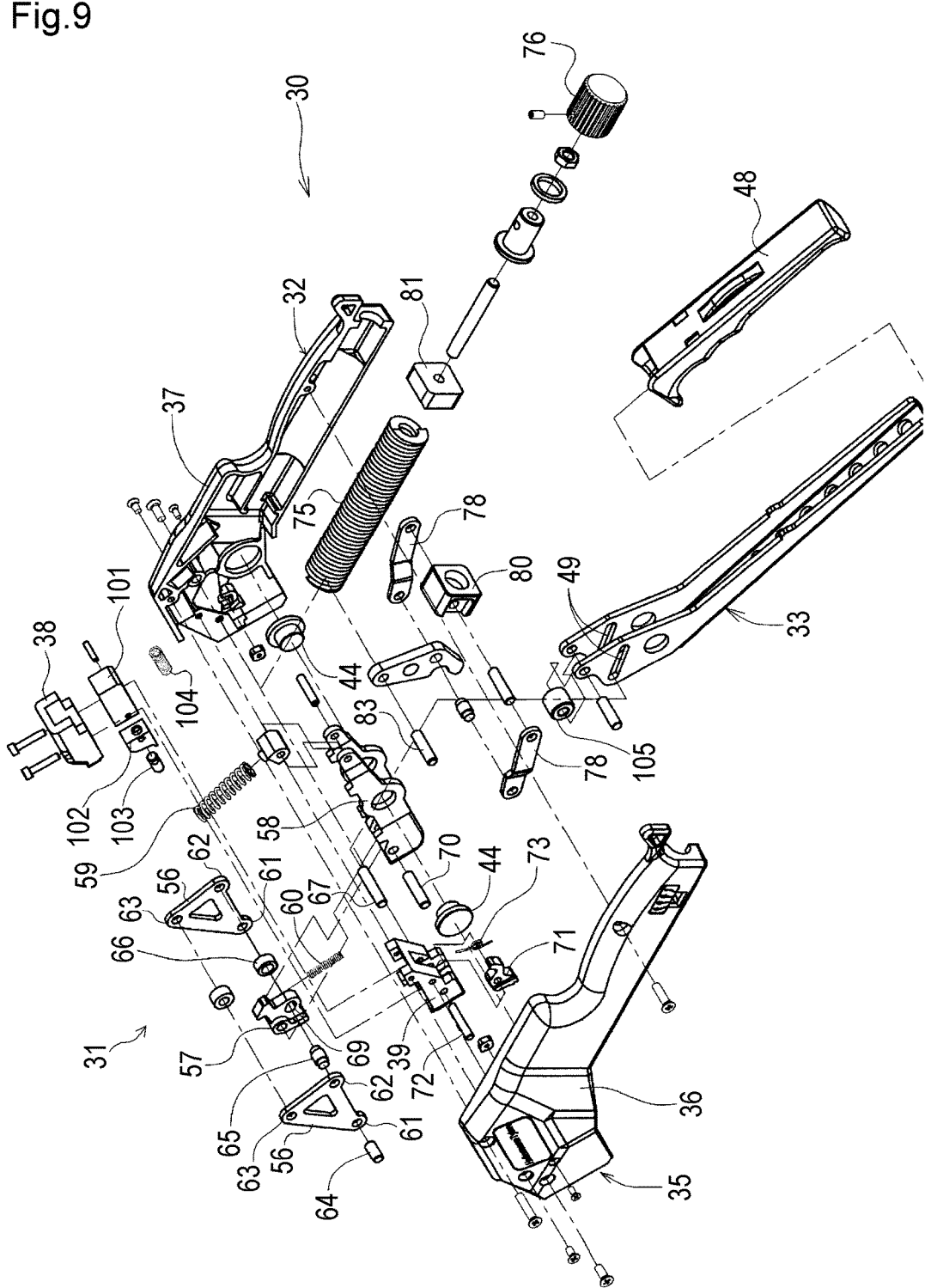
FIG. 9 is an exploded perspective view of a cable tie tool according to one embodiment of the present invention.
Figure 10:
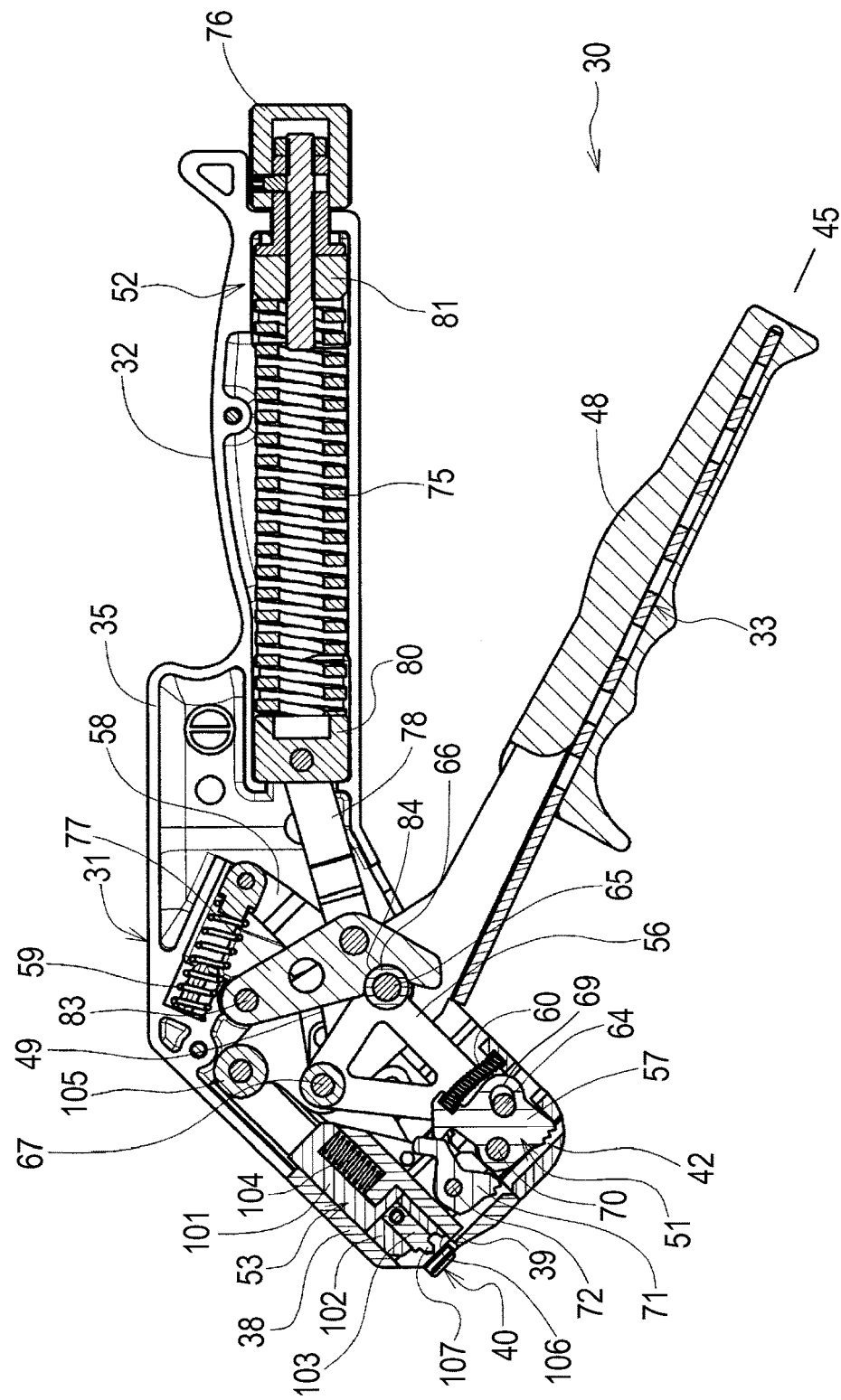
FIG. 10 is a cross-sectional view of the cable tie tool according to one embodiment of the present invention.

FIG. 8(a) shows a perspective view of a cable tie tool 30 according to one embodiment of the present invention. FIG. 8(b) shows a side view of the cable tie tool 30. FIG. 9 shows an exploded perspective view of the cable tie tool 30. FIG. 10 shows a side cross-sectional view of the cable tie tool 30. FIG. 11(a) and FIG. 11(b) show an example of a state of use of the cable tie tool 30.

As shown in FIG. 8, FIG. 9, FIG. 10, and FIG. 11, the cable tie tool 30 includes a punch member 103 capable of forming the protruded portion 21 at the distal end 8 of the strap portion 4 of the cable tie 2. In this embodiment, the cable tie tool 30 is a manually operated bundling tool having a tool body 31, a handle 32, and a lever 33. The tool is configured capable of carrying out a step of fastening together the material to be bundled 3 with the cable tie 2, and a step thereafter of cutting and securing the cable tie 2, by the lever 33 being rotated in the same direction relative to the handle 32.

The tool body 31 includes a hollow housing 35. This housing 35 is formed by a left housing 36 and a right housing 37. At the front end of the housing 35 are provided a cutter guide 38 and a cutter base 39 having their distal ends facing outward. A strap holder 40 is provided at the tip of this cutter guide 38.

The strap holder 40 can hold part of the cable tie 2 and, in this embodiment, is formed by left and right hooks 41. The strap holder 40 is designed such that, when the head portion 5 of the cable tie 2 is inserted from the front of the tool body 31 into the space between the left and right hooks 41 and the cutter guide 38, the strap holder can hold the head portion 5 of the cable tie 2 in that state.

In the tool body 31, a passageway 42 is formed behind the strap holder 40. The passageway 42 can let the strap portion 4 pass therethrough, and is formed separable into front and rear parts. More specifically, the passageway 42 is formed at the distal end of the cutter base 39 and at one end in the longitudinal direction of a base arm 58 to be described later. The distal end 8 of the strap portion 4 is passed through the passageway 42 from the front of the tool body 31 via the strap holder 40.

The handle 32 is formed as a hollow tubular member and arranged to have its longitudinal direction extending along the front to back direction. The handle 32 is joined to be integral with the housing 35 at one end (front end) in the longitudinal direction such that its inside is continuous with the inside of the housing 35.

The lever 33 is disposed below the handle 32 so as to face it. The lever 33 is attached obliquely to the handle 32, with its front side high and its rear side low, and with its one end (front end) in the longitudinal direction being inserted in the housing 35. The lever 33 is supported rotatable around left and right first support shafts 44 extending in a left to right direction relative to the housing 35.

The lever 33 is configured to be able to rotate toward or away from the handle 32, and to move to a first rotated position (normal position) 45 a predetermined distance away from the handle 32, a second rotated position 46 closer to the handle 32 than this first rotated position 45, and a third rotated position 47 closer to the handle 32 than this second rotated position 46.

The lever 33 includes a grip 48 in a part outside of the housing 35. The grip 48 is disposed on the rear side of the lever 33. The lever 33 further includes engagement grooves 49 in a part inside of the housing 35. The engagement grooves 49 are provided on the opposite side of the grip 48 over the fulcrum of rotation of the lever 33 and formed to extend substantially along the front to back direction.

In this embodiment, the cable tie tool 30 includes a fastening mechanism 51, a pull adjustment mechanism 52, and a processing mechanism 53. The fastening mechanism 51 and the processing mechanism 53 are provided in the tool body 31. The pull adjustment mechanism 52 is provided to extend over the tool body 31 and the handle 32.

The fastening mechanism 51 is configured to be able to pull the tip 8a of the distal end 8 protruding from the head portion 5 in a direction away from the head portion 5 (rearward) in accordance with the rotating operation of the lever 33 so as to fasten up the material to be bundled 3 together, with the distal end 8 of the strap portion 4 being passed through the passageway 42, after the distal end 8 of the strap portion 4 wrapped around the material to be bundled 3 has been passed through the passage 14 in the head portion 5 that is held by the strap holder 40. More specifically, the fastening mechanism 51 includes triangular links 56, a locking pawl 57, the base arm 58 mentioned above, a return spring 59, and a biasing spring 60.

The triangular links 56 have a first angle part 61, a second angle part 62, and a third angle part 63. The first angle part 61 is linked to the locking pawl 57 via a first pin 64. The second angle part 62 is provided with a second pin 65 that is positioned substantially coaxial with the first support shafts 44. A roller 66 is fitted around the second pin 65. The third angle part 63 is provided with a third pin 67. This third pin 67 is engaged with the engagement grooves 49 of the lever 33 so as to be slidable in the grooves along the longitudinal direction thereof (substantially front to back direction).

The triangular links 56 are biased by the pull adjustment mechanism 52 to rotate counterclockwise in FIG. 10 around the second pin 65 until the tension applied by the action of the fastening mechanism 51 reaches a predetermined value that is preset with the use of the pull adjustment mechanism 52. Thus, when the fastening mechanism 51 is in action, the third pin 67 makes engagement with the front end in the engagement grooves 49 of the lever 33, and this engagement is maintained. Accordingly, when the lever 33 is rotated from the first rotated position 45 to the second rotated position 46, the triangular links 56 rotate counterclockwise in FIG. 10 around the second pin 65 with this rotation.

The locking pawl 57 is for locking the strap portion 4 entering the rear part of the passageway 42, and disposed to face the rear part of the passageway 42. The locking pawl 57 is formed with an elongated slot 69 extending substantially in the front to back direction, and the first pin 64 engages with this elongated slot 69 so as to be slidable in the longitudinal direction. The locking pawl 57 is rotatably connected to one end in the longitudinal direction of the base arm 58 via a second support shaft 70 disposed more to the front than the first pin 64.

The base arm 58 is supported rotatable around the first support shafts 44 relative to the housing 35 in a mid portion in the longitudinal direction thereof. The base arm 58 is connected to the return spring 59 at the other end in the longitudinal direction via a spring receptacle. This return spring 59 biases the base arm 58 so that the base arm 58 rotates clockwise in FIG. 10 around the first support shafts 44.

The biasing spring 60 is provided between the locking pawl 57 and the base arm 58. This biasing spring 60 biases the locking pawl 57 so that the locking pawl 57 rotates counterclockwise in FIG. 10 around the second support shaft 70 and exhibits its function. When the lever 33 is located substantially at the first rotated position 45 or the third rotated position 47, the locking pawl 57 is stopped by a chuck piece 71 from rotating in a direction in which it is biased by the biasing spring 60, so that the locking pawl does not move away from or make contact with the distal end 8 of the strap portion 4 passed through the rear part of the passageway 42 (so that the locking pawl does not act).

The chuck piece 71 is for holding the strap portion 4 entering the front part of the passageway 42 together with the cutter base 39, and disposed to face the front part of the passageway 42. The chuck piece 71 is supported rotatable around a third support shaft 72 relative to the cutter base 39.

The third support shaft 72 is provided with a torsion coil spring 73. This torsion coil spring 73 biases the chuck piece 71 so that the chuck piece 71 rotates clockwise in FIG. 10 around the third support shaft 72 and exhibits its function. When the lever 33 is located substantially at the first rotated position 45 or the third rotated position 47, the chuck piece 71 is stopped by the locking pawl 57 from rotating in a direction in which it is biased by the torsion coil spring 73, so that the chuck piece 71 moves away from or makes contact with the distal end 8 of the strap portion 4 passed through the front part of the passageway 42 (so that the chuck piece does not act on the distal end 8).

The pull adjustment mechanism 52 allows any given value to be set as a maximum pulling force applied by the operation of the fastening mechanism 51. In this embodiment, the pull adjustment mechanism 52 includes a pull adjustment spring 75, an adjustment knob 76, a tension arm 77, and tension bars 78.

The pull adjustment spring 75 is arranged inside the handle 32 such that it expands and contracts along the longitudinal direction of the handle 32 (front to back direction). Inside the handle 32, a spring receptacle 80 is arranged at one end (front end) in the longitudinal direction, while a square nut 81 is provided at the other end (rear end) in the longitudinal direction so as to be movable back and forth. The pull adjustment spring 75 is disposed between the spring receptacle 80 and the square nut 81.

The adjustment knob 76 is disposed at the back of the handle 32. The adjustment knob 76 has a knob shaft extending in the front to back direction and threaded into the square nut 81 through the knob shaft so that the knob can rotate relative to the handle 32.

The tension arm 77 is disposed between the pull adjustment spring 75 and the triangular links 56 and supported rotatable around a fourth support shaft 83 relative to the housing 35 at one end in the longitudinal direction thereof. The tension arm 77 has a recess 84 that is arcuate in side view and can engage with the roller 66 attached to the second angle part 62 of the triangular links 56 via the second pin 65. The roller 66 fits in this recess 84 when the lever 33 is positioned at any of the first rotated position 45, second rotated position 46, and anywhere between the first rotated position 45 and the second rotated position 46.

The tension arm 77 is connected to the pull adjustment spring 75 via the tension bars 78 and the spring receptacle 80, and biased by this pull adjustment spring 75 to rotate clockwise in FIG. 10 around the fourth pin 83. Namely, the pull adjustment spring 75 can bias the triangular links 56 via the tension arm 77 when the roller 66 is fitted in the recess 84.

This way, when the adjustment knob 76 is rotated either to the left or right relative to the handle 32, the square nut 81 moves toward the spring receptacle 80 (forward), which compresses the pull adjustment spring 75 and its resilient force increases. As a result, the tension arm 77 connected to the pull adjustment spring 75 presses the triangular links 56 with more force, and thus the adjustment is made to increase the maximum value of tension (preset value).

On the other hand, when the adjustment knob 76 is rotated the other way, to the left or right, relative to the handle 32, the square nut 81 moves toward the adjustment knob 76 (backward), which allows the pull adjustment spring 75 to extend and its resilient force decreases. As a result, the tension arm 77 connected to the pull adjustment spring 75 presses the triangular links 56 with less force, and thus the adjustment is made to decrease the maximum value of tension (preset value).

The processing mechanism 53 is configured to be able to cut off the distal end 8 of the strap portion 4 protruding out from the head portion 5 of the cable tie 2 near the head portion 5, and to secure the distal end of the strap portion 4 wrapped around the material to be bundled 3 to the fixed end of the strap portion and to the head portion 5. In this embodiment, the processing mechanism 53 includes a holder 101, a cutting blade 102, the punch member 103 mentioned above, a return spring 104, and a cutter roller 105.

The holder 101 is provided inside the cutter guide 38. The holder 101 is configured to be guided by the cutter guide 38 as it can move toward or away from the strap holder 40 provided at the tip of the cutter guide.

The cutting blade 102 is provided inside the cutter guide 38 so as to be positioned closer to the strap holder 40 than the holder 101, as shown also in FIG. 14. The cutting blade 102 is connected to the holder 101 to move integrally therewith, and configured to be able to selectively assume a retracted position where it is housed in the cutter guide 38 substantially entirely, and an extended position where a blade 106 is protruded out of the cutter guide 38 so as to cut the cable tie 2 held by the strap holder 40.

The punch member 103 is provided inside the cutter guide 38 so as to be positioned closer to the strap holder 40 than the holder 101, as shown also in FIG. 14. The punch member 103 is connected to the holder 101 to move integrally therewith via the cutting blade 102, and configured to be able to selectively assume a retracted position where it is housed in the cutter guide 38 substantially entirely, and an extended position where a protruding portion 107 is protruded out of the cutter guide 38 so as to plastically deform part of the cable tie 2 held by the strap holder 40.

The punch member 103 is disposed such that the protruding portion 107 faces the through hole 13 in the head portion 5 when the head portion 5 of the cable tie 2 is held by the strap holder 40. The punch member 103 is configured to be able to insert the protruding portion 107 into the through hole 13 of the head portion 5 as it moves from the retracted position to the extended position, and successively to press a part of the distal end 8 of the strap portion 4 coinciding with the through hole 13 with this protruding portion 107 toward the backside of the cable tie 2, causing it to plastically deform. The punch member 103 can thus form the protruded portion 21 by this plastic deformation.

The protruding portion 107 of the punch member 103 has a shape corresponding to the protruded portion 21 for the locking structure 1 of the cable tie 2 according to this embodiment to be realized. Namely, the protruding portion 107 has a rectangular outer peripheral shape when viewed from the side of the strap holder 40, and includes a flat surface 108 that may be orthogonal to the longitudinal direction of the strap portion 4 in a portion corresponding to one front side of this rectangle. This flat surface 108 is capable of forming the engagement surface 22 of the protruded portion 21.

Moreover, the protruding portion 107 of the punch member 103 is formed in a pointed shape such that its tip (protruded end) protrudes downward. The pointed end of the tip is positioned at the front end thereof, preferably substantially in the center in the left to right direction, so that the peak of the protruded portion 21 will be positioned coplanar with the engagement surface 22.

The return spring 104 biases the holder 101 so that the cutting blade 102 and the punch member 103 are placed in the retracted position. The return spring 104 is arranged between the cutter base 39, which is fixed relative to the cutter guide 38, and the holder 101.

The cutter roller 105 is provided inside the housing 35 and rotatably supported at the front end of the lever 33. The cutter roller 105 separates from or makes contact with the holder 101 when the tension applied by the operation of the fastening mechanism 51 is below the preset value. On the other hand, when the tension applied by the operation of the fastening mechanism 51 reaches the preset value, the cutter roller 105 can push the holder 101 against the biasing force of the return spring 104 toward the strap holder 40 so as to move the cutting blade 102 and the punch member 103 from the retracted position to the extended position, as the lever 33 moves to the third rotated position 47.

Next, the bundling operation with the use of the cable tie tool 30 configured as described above will be explained. The locking structure 1 of the cable tie 2 described in the foregoing is realized during the process of this operation.

To start the bundling operation with the use of the cable tie tool 30, first, the cable tie 2 is manually wrapped around at least one item of the material to be bundled 3. For temporary fastening of this cable tie 2, the distal end 8 of the strap portion 4 of this cable tie 2 is inserted from the tip 8a into the passage 14 of the head portion 5 and the passageway 42 of the tool body 31, and the tip 8a is pulled in a direction away from the head portion 5 and the housing 35 (rearward). Also, the head portion 5 is held on the head holder 40.

At this time, as shown in FIG. 10, the lever 33 is not rotated and kept at the first rotated position 45. Therefore, the locking pawl 57 and chuck piece 71 restrict each other's rotation in respective biased directions, so that the locking pawl 57 does not lock the distal end 8 of the strap portion 4 in the rear part of the passageway 42, and the chuck piece 71 does not sandwich the distal end 8 of the strap portion 4 together with the cutter base 39 in the front part of the passageway 42. Accordingly, the strap portion 4 can be smoothly passed through the passageway 42.

Figure 12:
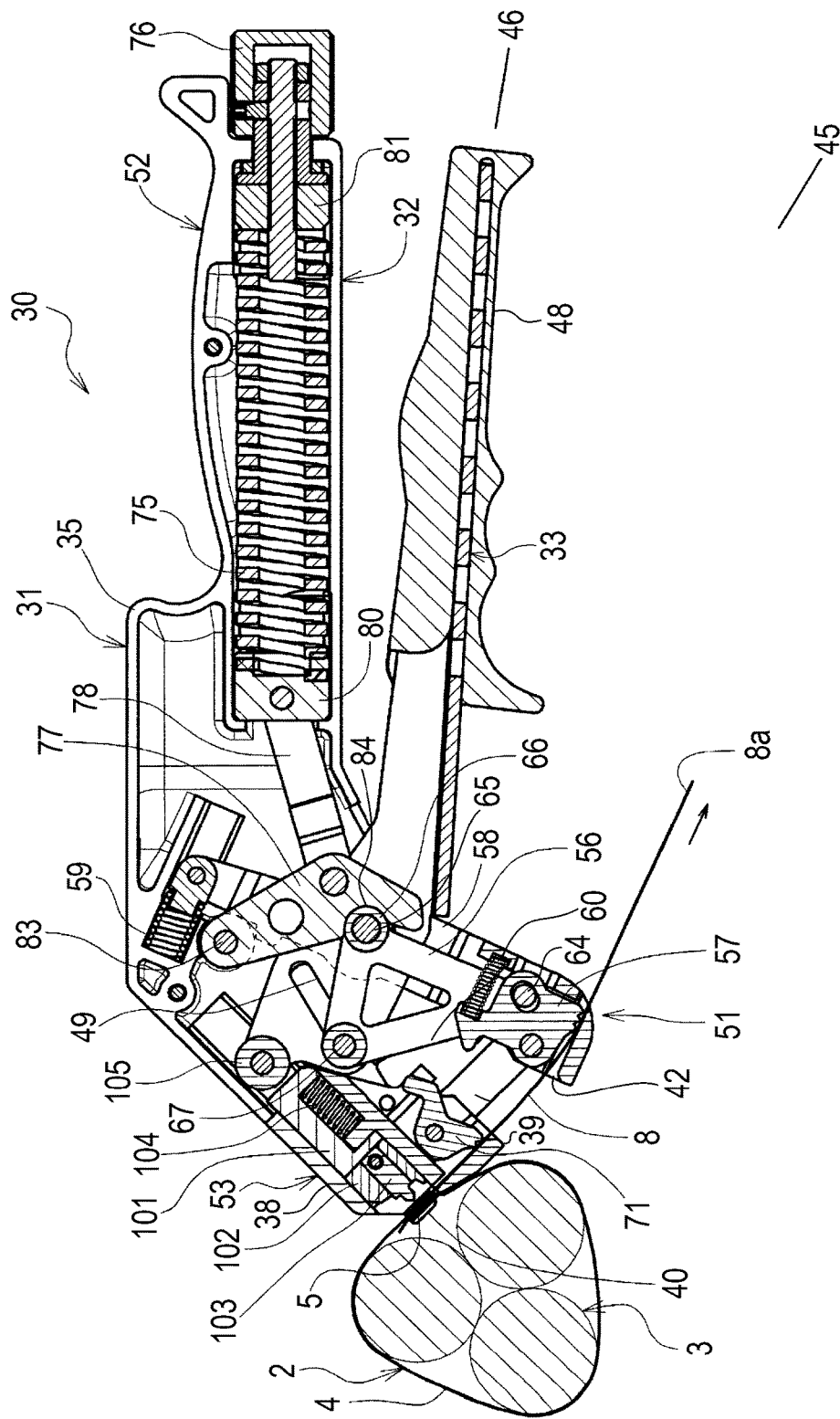
FIG. 12 is a cross-sectional view of the cable tie tool according to one embodiment of the present invention.

Next, the lever 33 is gripped and rotated so that it moves from the first rotated position 45 to the second rotated position 46 shown in FIG. 12. As the lever 33 rotates, the third angle part 63 of the triangular links 56 moves forward and downward, as well as the first angle part 61 of the triangular links 56 moves backward and downward away from the cutter base 39. Consequently, the locking pawl 57 is moved by the first pin 64 backward and downward away from the chuck piece 71, and with this movement of the locking pawl 57, the base arm 58 rotates counterclockwise in FIG. 10 around the first support shafts 44. The passageway 42 is separated into front and rear parts at this stage.

As a result, during the movement of the lever 33, the chuck piece 71 is released from the locking pawl 57 that was stopping its rotation, so that the chuck piece 71 rotates in the direction in which it is biased by the torsion coil spring 73. This causes the chuck piece 71 to sandwich the distal end 8 of the strap portion 4 together with the cutter base 39 in the front part of the passageway 42. At this time, the locking pawl 57 locks the distal end 8 of the strap portion 4 in the rear part of the passageway 42.

After the locking pawl 57 has locked the distal end 8 of the strap portion 4 in the rear part of the passageway 42, as the lever 33 moves, the distal end 8 of the strap portion 4 protruding from the head portion 5 is pulled backward and downward by the locking pawl 57. The chuck piece 71 provides a self-lock effect that stops displacement of the distal end 8 of the strap portion 4 toward the head portion 5 (forward) by sandwiching the distal end, but the chuck piece 71 allows the distal end 8 of the strap portion 4 to move backward even during this self-lock effect.

By the distal end 8 of the strap portion 4 being pulled backward, the length in the longitudinal direction of the region of the cable tie 2 wrapped around the material to be bundled is shortened, whereby the material to be bundled is fastened up. When the lever 33 reaches the second rotated position 46, the lever 33 can not be rotated further toward the handle 32. Thus one rotating operation of the lever 33, from the first rotated position 45 to the second rotated position 46, is complete. Namely, one process of fastening the cable tie 2 is complete.

After the completion of the fastening process, a return process is carried out. Namely, the lever 33 is released. This causes the base arm 58 to rotate clockwise in FIG. 12 around the first support shafts 44 by the resilient force of the return spring 59, and with this rotation, the lever 33 rotates toward the first rotated position 45. When the lever 33 approaches the first rotated position 45, at a predetermined distance therefrom, the distal end 8 of the strap portion 4 is released from the locking pawl 57. At this time, during a period in which the rotation of the chuck piece 71 in the biased direction is not restricted by the locking pawl 57, the self-lock effect of the chuck piece 71 functions, so that the distal end 8 of the strap portion 4 is kept at the current position not to return to the head portion 5 side.

When the lever 33 reaches the first rotated position 45 or close thereto, the lever 33 is gripped and the fastening process is carried out again, instantly. The fastening process and the return process are performed as one set at least once until the tension applied by the operation of the fastening mechanism 51 reaches the preset value. When the tension applied by the operation of the fastening mechanism 51 reaches the preset value by this action, the distal end 8 of the strap portion 4 can no longer be pulled further, but the lever 33 can then be rotated beyond the second rotated position 46 as far as to the third rotated position 47 shown in FIG. 13, and therefore the lever 33 is gripped tighter to perform the processing step.

Figure 13:
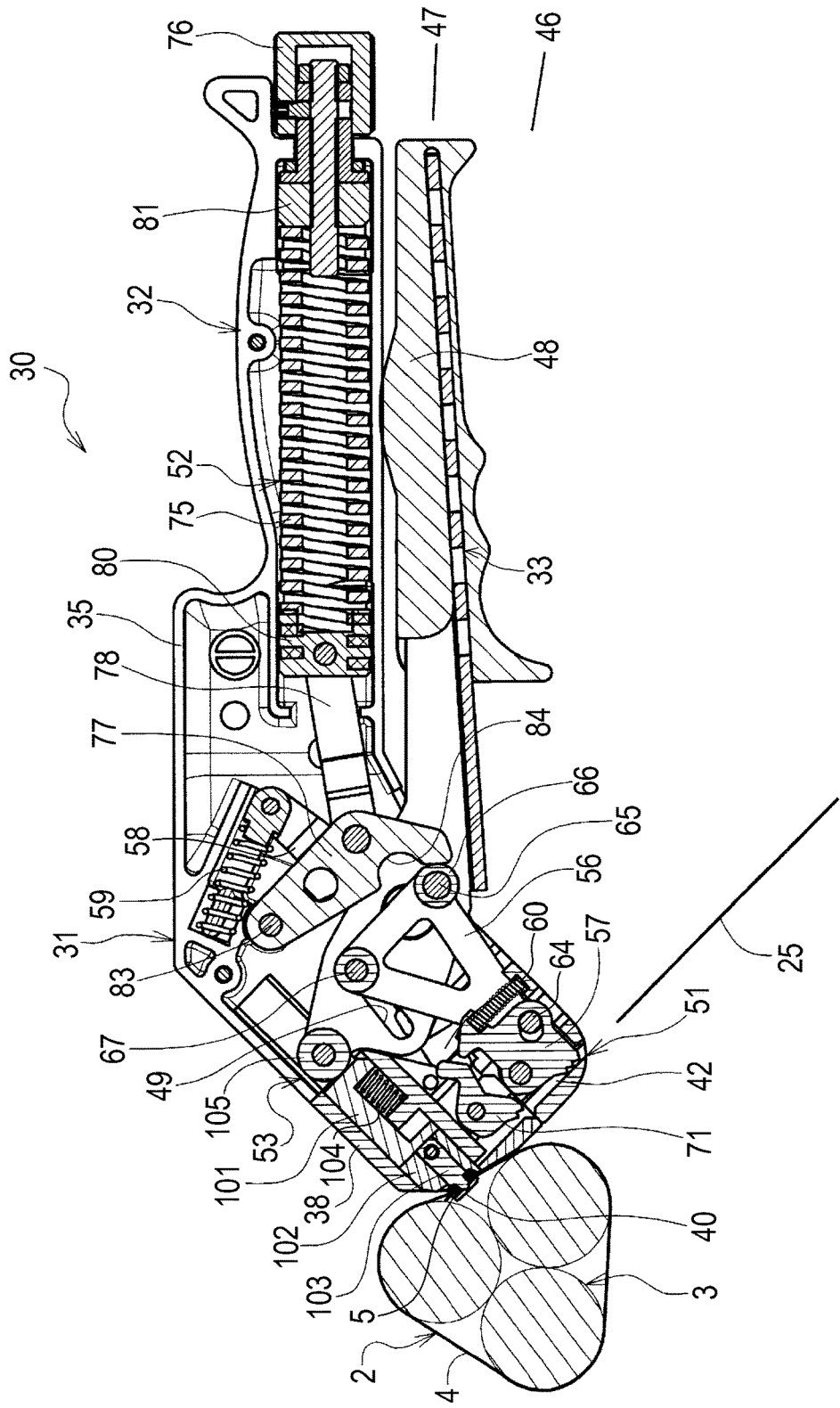
FIG. 13 is a cross-sectional view of the cable tie tool according to one embodiment of the present invention.

When the lever 33 is rotated toward the third rotated position 47, the relative positions of the engagement grooves 49 of the lever 33 and the third pin 67 of the triangular links 67 change, and the roller 66 on the triangular links 56 is disengaged from the recess 84 in the tension arm 77 biased by the tension adjustment spring 75. This causes the base arm 58 to rotate in the direction in which it is biased by the return spring 59 independently of the lever 33, so that the locking pawl 57 and the chuck piece 71 come to stop each other's rotation as shown in FIG. 13.

The cutter roller 105 of the lever 33 then moves toward the holder 101, and pushes the cutting blade 102 and the punch member 103 via this holder 101. Thereby, the cutting blade 102 moves from the retracted position to the extended position, and cuts off the distal end 8 of the strap portion 4 protruding backward from the head portion 5 of the cable tie 2 with the blade 106 near the head portion 5. Thus, as shown in FIG. 13, a surplus length 25 of the cable tie 2 is removed.

The punch member 103 also moves from the retracted position to the extended position as shown in FIG. 14(a) and FIG. 14(b), and plastically deforms a part of the distal end 8 of the strap portion 4 protruding backward from the head portion 5 of the cable tie 2 with the protruding portion 107. The protruding portion 107 of the punch member 103 first enters the through hole 13 of the head portion 5, and successively presses a part of the distal end 8 of the strap portion 4 coinciding with the through hole 13 toward the backside of the cable tie 2, plastically deforming this part while breaking its proximal side so that the opening 24 will be formed. This way, the protruded portion 21 is formed inside the first locking hole 7 of the distal end 8 of the strap portion 4 and inside the second locking hole 12 of the head portion 5, whereby the locking structure 1 of the cable tie 2 described above can be realized. The processing step is thus complete.

As described above, with the use of the cable tie tool 30, the bundling operation can be completed, through the fastening step and return step, and the processing step thereafter. After the completion of the processing step, the lever 33 is rotated toward the first rotated position 45, so that the roller 66 on the triangular links 56 fits in the recess 84 of the tension arm 77, for allowing the fastening step with the use of the cable tie tool 30 to be started again.

While the cable tie tool according to the present invention is described as the cable tie tool 30 that can form the protruded portion 21 in this embodiment, the invention is not limited to this cable tie tool 30, and may be configured otherwise as long as it can form the protruded portion in the locking structure of the cable tie according to the present invention.

DESCRIPTION OF REFERENCE SIGNS

1: Cable tie locking structure
2: Cable tie
3: Material to be bundled
4: Strap portion
5: Head portion
6: Proximal end of strap portion
7: First locking hole
8: Distal end of strap portion
12: Second locking hole
13: Through hole
18: First inner wall surface
19: Second inner wall surface
21: Protruded portion
22: Engagement surface
23: Peak of protruded portion
30: Cable tie tool
103: Punch member

The invention claimed is:

1. A cable tie locking structure comprising a cable tie including a strip of plastically deformable strap portion having a first locking hole that extends through in a thickness direction at a proximal end thereof, and a head portion provided so as to surround the proximal end and a distal end of the strap portion that are overlapped upon one another, and secured to the proximal end, the head portion including a second locking hole and a through hole at positions respectively facing the proximal end and the distal end of the strap portion to coincide with the first locking hole of the strap portion, the locking structure securing the distal end of the strap portion to the proximal end thereof and to the head portion so as to keep the cable tie wrapped around and holding together material to be bundled, wherein:

the first locking hole is formed in a shape with a first portion located nearer to the proximal end of the strap portion having a larger width in a short-side direction of the strap portion than that of a second portion extending along a longitudinal direction of the strap portion, and has a first inner wall surface extending in a direction substantially orthogonal to the longitudinal direction of the strap portion at the first portion located nearer to the proximal end of the strap portion;

the second locking hole is formed in a shape with a third portion located nearer to the proximal end of the strap portion having a larger width in the short-side direction of the strap portion than that of a fourth portion extending along the longitudinal direction of the strap portion, and has a second inner wall surface extending in a direction substantially orthogonal to the longitudinal direction of the strap portion at the third portion located nearer to the proximal end of the strap portion;

the distal end of the strap portion has a protruded portion that protrudes through the first locking hole and into the second locking hole at a point where the first locking hole, the second locking hole, and the through hole coincide with each other; and the protruded portion has an engagement surface that faces the first inner wall surface and the second inner wall surface and that extends along these inner wall surfaces, so that the protruded portion can engage with the first inner wall surface and the second inner wall surface at this engagement surface, wherein the engagement surface is formed to have an arch-like shape when viewed from the proximal end of the cable tie along the opening.

2. The cable tie locking structure according to claim 1, wherein the protruded portion is formed in a pointed shape such that a peak thereof is positioned substantially coplanar with the engagement surface.

3. The cable tie locking structure according to claim 1, wherein an embossed stopper is formed in the strap portion on one side of the first locking hole and a cut-and-lifted pawl is formed in the strap portion on another side of the first locking hole, said stopper and pawl configured to secure the head portion therebetween.

4. A cable tie tool in combination with a cable tie having a locking structure, the cable tie tool comprising: a punch member configured to form a protruded portion in the cable tie, and the cable tie comprising a strip of plastically deformable strap portion having a first locking hole that extends through in a thickness direction at a proximal end thereof, and a head portion provided so as to surround the proximal end and a distal end of the strap portion that are overlapped upon one another, and secured to the proximal end, the head portion including a second locking hole and a through hole at positions respectively facing the proximal end and the distal end of the strap portion to coincide with the first locking hole of the strap portion, the locking structure securing the distal end of the strap portion to the proximal end thereof and to the head portion so as to keep the cable tie wrapped around and holding together material to be bundled, wherein the first locking hole is formed in a shape with a first portion located nearer to the proximal end of the strap portion having a larger width in a short-side direction of the strap portion than that of a second portion extending along a longitudinal direction of the strap portion, and has a first inner wall surface extending in a direction substantially orthogonal to the longitudinal direction of the strap portion at the first portion located nearer to the proximal end of the strap portion, wherein the second locking hole is formed in a shape with a third portion located nearer to the proximal end of the strap portion having a larger width in the short-side direction of the strap portion than that of a fourth portion extending along the longitudinal direction of the strap portion, and has a second inner wall surface extending in a direction substantially orthogonal to the longitudinal direction of the strap portion at the third portion located nearer to the proximal end of the strap portion, wherein the protruded portion is formed in a distal end of the strap portion, said protruded portion protrudes through the first locking hole and into the second locking hole at a point where the first locking hole, the second locking hole, and the through hole coincide with each other, wherein the protruded portion has an engagement surface that faces the first inner wall surface and the second inner wall surface and that extends along these inner wall surfaces, so that the protruded portion can engage with the first inner wall surface and the second inner wall surface at this engagement surface, and wherein the engagement surface is formed to have an arch-like shape when viewed from the proximal end of the cable tie along the opening.

5. A cable tie tool in combination with a cable tie having a locking structure, the cable tie tool comprising: a punch member configured to form a protruded portion in the cable tie, and the cable tie comprising a strip of plastically deformable strap portion having a first locking hole that extends through in a thickness direction at a proximal end thereof, and a head portion provided so as to surround the proximal end and a distal end of the strap portion that are overlapped upon one another, and secured to the proximal end, the head portion including a second locking hole and a through hole at positions respectively facing the proximal end and the distal end of the strap portion to coincide with the first locking hole of the strap portion, the locking structure securing the distal end of the strap portion to the proximal end thereof and to the head portion so as to keep the cable tie wrapped around and holding together material to be bundled, wherein the first locking hole is formed in a shape with a first portion located nearer to the proximal end of the strap portion having a larger width in a short-side direction of the strap portion than that of a second portion extending along a longitudinal direction of the strap portion, and has a first inner wall surface extending in a direction substantially orthogonal to the longitudinal direction of the strap portion at the first portion located nearer to the proximal end of the strap portion, wherein the second locking hole is formed in a shape with a third portion located nearer to the proximal end of the strap portion having a larger width in the short-side direction of the strap portion than that of a fourth portion extending along the longitudinal direction of the strap portion, and has a second inner wall surface extending in a direction substantially orthogonal to the longitudinal direction of the strap portion at the third portion located nearer to the proximal end of the strap portion, wherein the protruded portion is formed in a distal end of the strap portion, said protruded portion protrudes through the first locking hole and into the second locking hole at a point where the first locking hole, the second locking hole, and the through hole coincide with each other, wherein the protruded portion has an engagement surface that faces the first inner wall surface and the second inner wall surface and that extends along these inner wall surfaces, so that the protruded portion can engage with the first inner wall surface and the second inner wall surface at this engagement surface, wherein the engagement surface is formed to have an arch-like shape when viewed from the proximal end of the cable tie along the opening, and wherein the protruded portion is formed in a pointed shape such that a peak thereof is positioned substantially coplanar with the engagement surface.

* * * * *